US009835268B2

(12) United States Patent
Roodenburg et al.

(10) Patent No.: US 9,835,268 B2
(45) Date of Patent: Dec. 5, 2017

(54) MARINE PIPELINE INSTALLATION SYSTEM AND METHOD

(71) Applicant: ITREC B.V., Schiedam (NL)

(72) Inventors: Joop Roodenburg, Delft (NL); Terence Willem August Vehmeijer, The Hague (NL); Ronny Lambertus Waltherus Nouwens, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 14/990,240

(22) Filed: Jan. 7, 2016

(65) Prior Publication Data

US 2016/0238158 A1 Aug. 18, 2016

Related U.S. Application Data

(63) Continuation of application No. 14/762,421, filed as application No. PCT/NL2014/050048 on Jan. 30, 2014, now Pat. No. 9,255,651.

(30) Foreign Application Priority Data

Feb. 1, 2013 (NL) .................................... 2010235
Feb. 8, 2013 (NL) .................................... 2010280

(51) Int. Cl.
*F16L 1/19* (2006.01)
*F16L 1/20* (2006.01)
(Continued)

(52) U.S. Cl.
CPC .............. *F16L 1/207* (2013.01); *B63B 35/03* (2013.01); *F16L 1/19* (2013.01); *F16L 1/203* (2013.01);
(Continued)

(58) Field of Classification Search
CPC ..... F16L 1/19; F16L 1/23; F16L 1/203; F16L 1/205; F16L 1/207; F16L 1/235; B63B 35/03
See application file for complete search history.

(56) References Cited

U.S. PATENT DOCUMENTS

2003/0044234 A1   3/2003   Stockstill
2003/0044235 A1   3/2003   Stockstill
(Continued)

FOREIGN PATENT DOCUMENTS

NL         EP 1696163 A1 *   8/2006   ................ F16L 1/19
WO    WO 2007/108673 A1      9/2007
(Continued)

OTHER PUBLICATIONS

International Search Report, issued in PCT/NL2014/050048, dated May 8, 2014.
Search Report issued in Netherlands priority application 2010280, dated Sep. 27, 2013.
Written Opinion of the International Searching Authority, issued in PCT/NL2014/050048, dated May 8, 2014.

*Primary Examiner* — Tara M. Pinnock
(74) *Attorney, Agent, or Firm* — Birch, Stewart, Kolasch & Birch, LLP

(57) ABSTRACT

A marine pipeline installation system for laying an offshore pipeline and/or installing a subsea riser includes a pipeline launch tower, a pipeline guide provided at an elevated position for guiding said pipeline to the pipeline launch trajectory along said tower, one or more tensioners, an abandonment and recovery (A&R) system including at least one A&R cable and associated A&R winch and a sheave arrangement with one or more sheaves supported by the pipeline launch tower at an upper position thereof. An auxiliary trolley is provided which is adapted to support the weight of the launched pipeline and which is movable along a rail in the pipeline launch trajectory when the one or more tensioner frames are in the retracted non-operable position, from a position above the uppermost tensioner to a position
(Continued)

below the lowermost tensioner, the rail being supported by the pipeline launch tower.

16 Claims, 13 Drawing Sheets

(51) Int. Cl.
*F16L 1/23* (2006.01)
*F16L 1/235* (2006.01)
*B63B 35/03* (2006.01)

(52) U.S. Cl.
CPC .................. *F16L 1/205* (2013.01); *F16L 1/23* (2013.01); *F16L 1/235* (2013.01)

(56) References Cited

U.S. PATENT DOCUMENTS

| | | | |
|---|---|---|---|
| 2007/0258772 A1 | 11/2007 | Bursaux et al. | |
| 2011/0097156 A1* | 4/2011 | Pose | B63B 35/03 405/166 |
| 2012/0114419 A1* | 5/2012 | Pose | F16L 1/19 405/166 |

FOREIGN PATENT DOCUMENTS

| | | |
|---|---|---|
| WO | WO 2009/134116 A1 | 11/2009 |
| WO | WO 2011/016719 A1 | 2/2011 |
| WO | WO 2012/091556 A1 | 7/2012 |
| WO | WO 2013/089561 A1 | 6/2013 |

\* cited by examiner

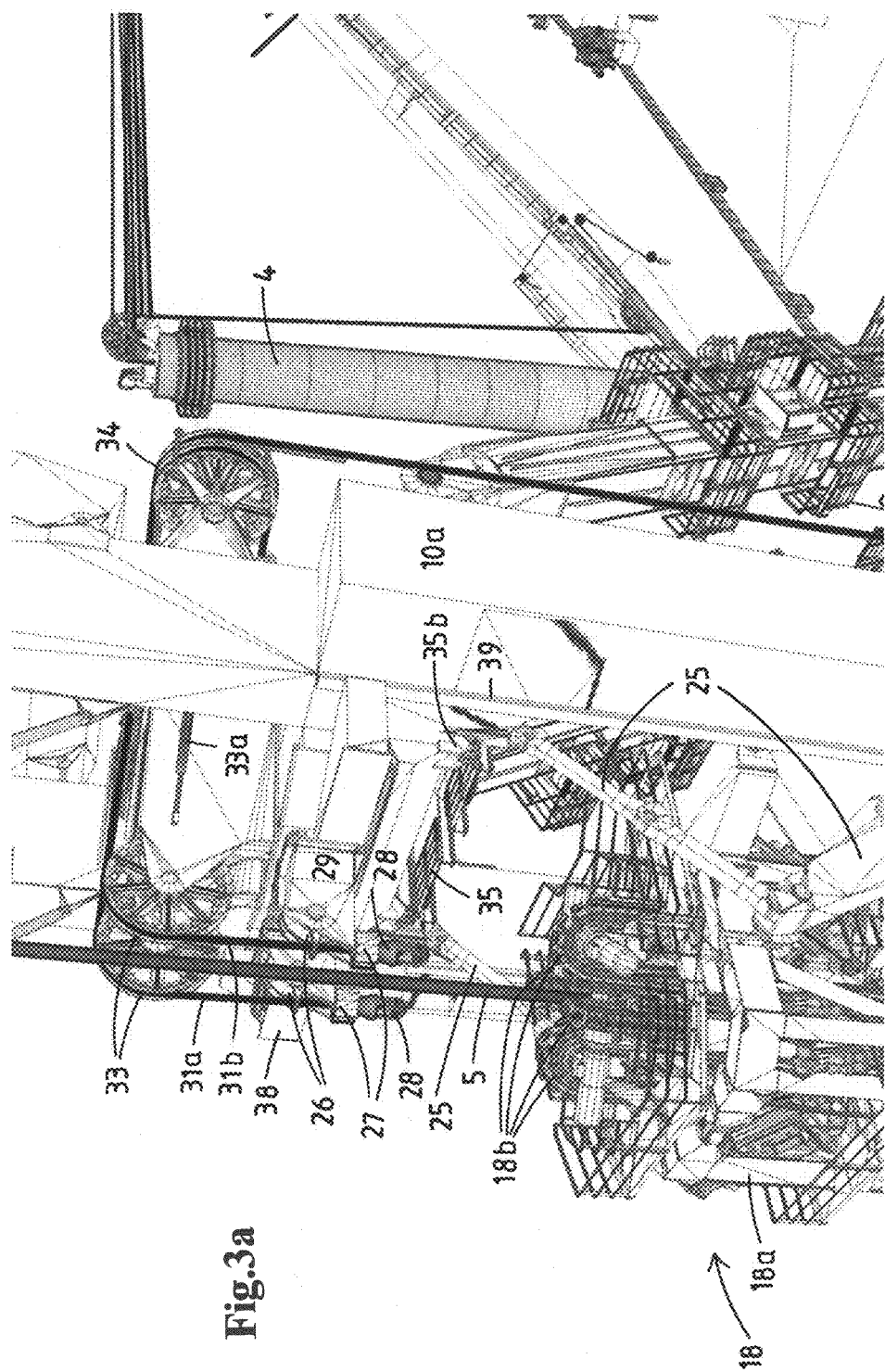

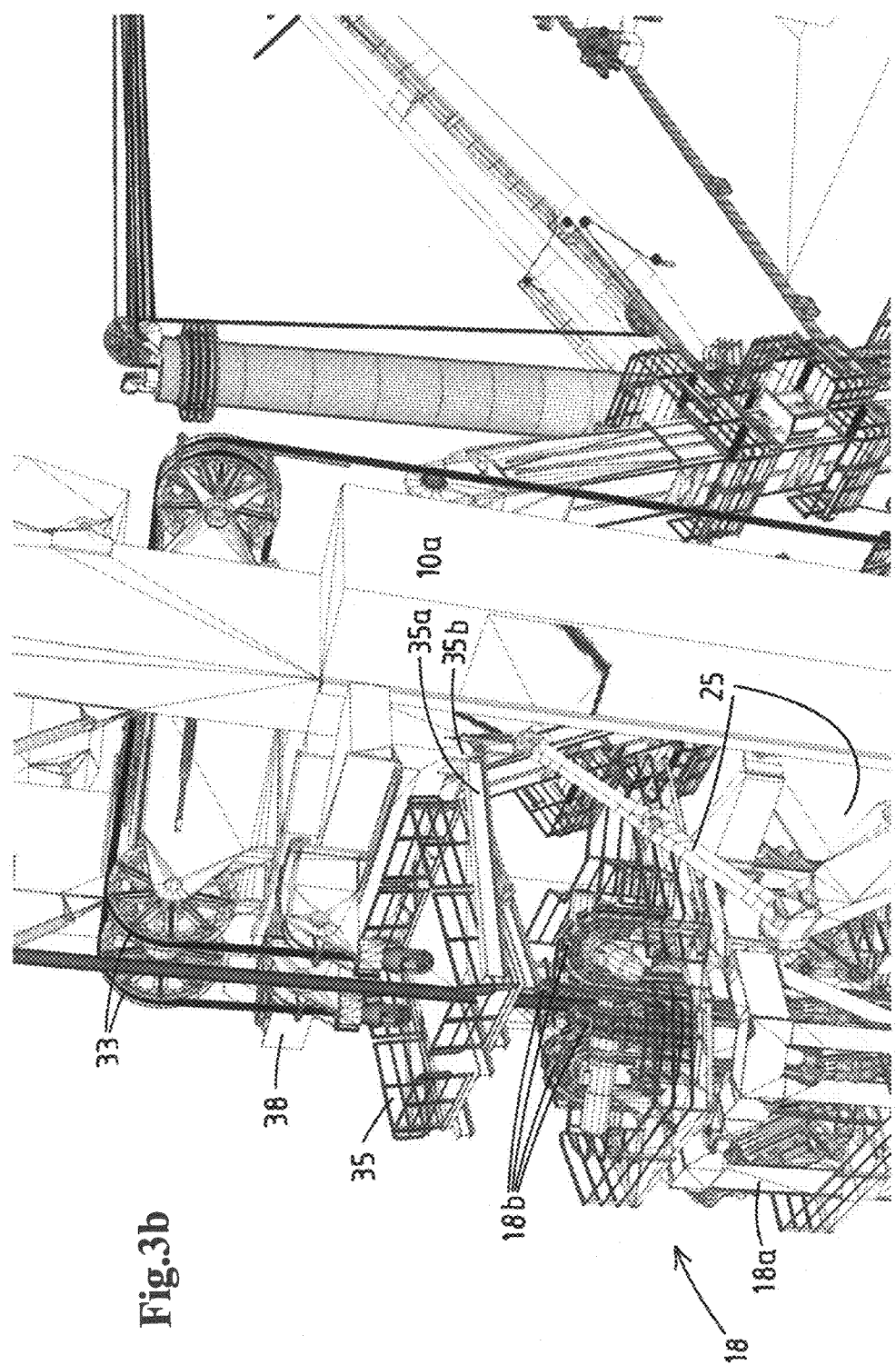

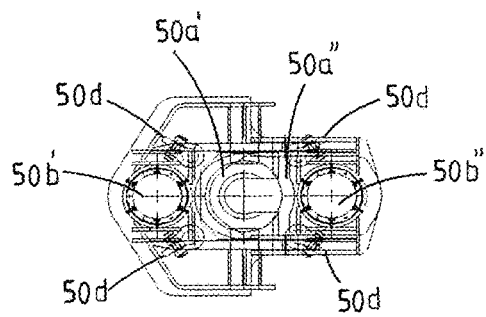
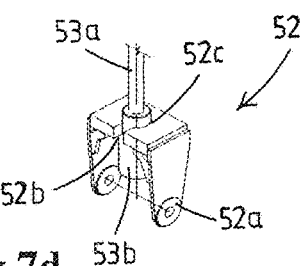
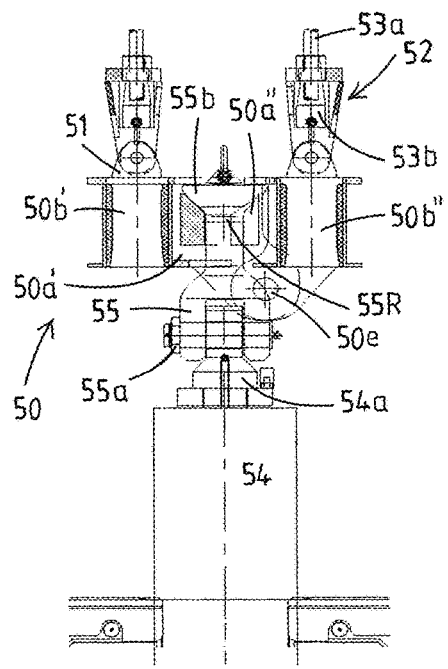
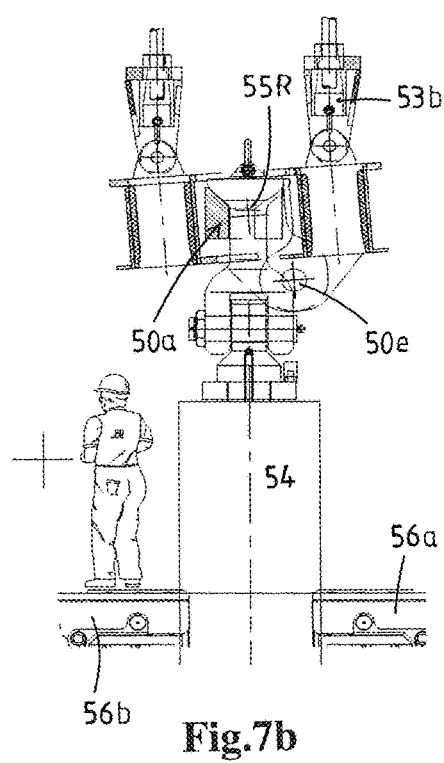
Fig.7c
Fig.7d
Fig.7a
Fig.7b

MARINE PIPELINE INSTALLATION SYSTEM AND METHOD

This application is a Continuation of copending application Ser. No. 14/762,421, filed on Jul. 21, 2015, which was filed as PCT International Application No. PCT/NL2014/050048 on Jan. 30, 2014, which claims the benefit under 35 U.S.C. §119(a) to Patent Application No. 2010280, filed in the Netherlands on Feb. 8, 2013 and to Patent Application No. 2010235, filed in the Netherlands on Feb. 1, 2013, all of which are hereby expressly incorporated by reference into the present application.

The present invention relates to a marine pipeline installation system according to the preamble of claim 1.

Such a system is known e.g. from WO2012/091556 from the same applicant. WO2009/134116 and WO2007/108673 of the same applicant describe alternative pipeline installation systems comprising some of the features of the preamble of claim 1. In the known systems the support assembly of one or more tensioner frames is adapted to allow for displacement of the tensioner frame with respect to the tower between an active position, wherein the pipeline launch trajectory extends through the tensioner frame between the tracks, so that the tracks can engage on a pipeline, and a retracted non-operable position, so that an auxiliary trolley is moveable up and down in the pipeline launch trajectory.

The aim of the present invention was to provide an improved marine pipelaying system, or at least an alternative system. The invention further aims to provide improved pipeline installation methods and systems therefor. The invention also aims to provide an improved riser installation system and method.

This aim is achieved in that auxiliary trolley according to the invention comprises:
  an A&R connector allowing the A&R cable to be connected to the auxiliary trolley at the position above the uppermost tensioner and thereby allowing the auxiliary trolley to lower with the launched pipeline suspended therefrom;
  an A&R cable guide allowing the A&R cable to be guided by the auxiliary trolley and pass along the auxiliary trolley during A&R of the launched pipeline connected to the A&R cable, at least at the position below the lowermost tensioner.

The marine pipeline installation system according to the present invention is a system for laying an offshore pipeline and/or installing a subsea riser, said system at least being adapted to carry out the reel lay method. The system is suitable for laying flexible pipelines, as well as rigid pipelines. The present invention also relates to the installation of pipeline in the form of a subsea riser, e.g. between a wellhead and a vessel, drilling/production facility, etc. As will be elucidated later, the system may also be suitable for laying pipe sections in a J-lay mode. In addition, the system may also be suitable for installing accessories in or onto a pipeline, and for handing over (transferring) a launched pipeline from a first marine pipeline installation system according to the invention to a second marine system which comprises a winch and a cable.

Preferably, the system according to the invention comprises a vessel, but alternatively the system could also be provided on a platform. The vessel is e.g. a monohull vessel, a twin-hull vessel, a semi-submersible vessel.

The system comprises one or more storage reels for storage of the pipeline to be installed, which storage reels may be provided on a vessel. These may be storage reels having a vertical axis, such as carousels, or having a horizontal axis. It is conceivable that the reels are stored on deck of the vessel, but it is also possible to store the one or more reels in the hull of the vessel. Reel supply vessels may be provided near the vessel according to the invention, to supply reels provided with new pipelines to the vessel, to replace the empty reels of which the pipeline has been launched.

The marine pipeline installation system according to the invention is also provided with a pipeline launch tower, which is adapted for launching the pipeline in a pipeline launch trajectory into the sea, in the direction of the seabed. The pipeline launch trajectory extends parallel with the tower, preferably adjacent the tower. It is also conceivable, in particular when the tower is of a derrick-type construction, that the pipeline launch trajectory extends in the tower. In an embodiment where the marine pipeline installation system comprises a vessel having a moonpool, such a tower is often, but not necessarily, placed adjacent or over the moonpool of the vessel, and the marine pipelaying system is adapted to lay pipeline through said moonpool. It is also possible to place the tower at another suitable location, e.g. at the stern of the vessel. In general the term tower here refers to a raised structure on the vessel. In a possible embodiment, the pipeline launch tower is mounted pivotably on said vessel to adjust inclination of the tower.

A pipeline guide is provided at an elevated position for guiding said pipeline to the pipeline launch trajectory along said tower. Preferably the pipeline guide is provided at an elevated position on the tower. The pipeline guide provides a curved path for guiding the pipeline. Known pipeline guides include a large diameter pipeline guide wheel or a semi-circular guide structure, e.g. provided with rollers or chains. Possibly, the pipeline guide is provided moveable, e.g. retractable as described in WO2012/091556.

As common for reel lay pipelaying systems, one or more pipeline tensioners are provided at different heights below the pipeline guide for launching the pipeline. Commonly two tensioners are provided, but versions with one or three tensioners are also known. In practice, a single tensioner can be designed to support a pipeline weight of more than 50 tons, and tensioner capacities of more than 100 tons are also not uncommon.

Each tensioner comprises a tensioner frame and multiple tracks, also called caterpillars, supported by said tensioner frame. The tracks, often three or four tracks, are adapted for engaging the pipeline and supporting at least part of the weight of the launched pipeline. As is known in the art, the tensioner frame is preferably a frame which forms an 'annular frame structure' extending around the pipeline launch trajectory in normal operation, within which frame structure the tracks are mounted. The tensioner frame is supported via an associated support assembly, preferably by the pipeline launch tower. Alternatively, a separate tensioner support structure may be provided. In an embodiment, the tensioner frame is supported by parallel bar linkage on the tower.

The tracks are mounted in said tensioner frame in a movable manner in order to allow for adjustment of the gap between the tracks to accommodate various pipe diameters.

It is also known from the prior art to design the tensioner frame 'oversized' with respect to regular pipeline diameters, so that the gap between the tracks can be increased to a large size which allows for the passage of an accessory fitted on (the end of) or in the pipeline, e.g. a connector on the end of or in a flexible pipeline. Such connectors are bulky and have a diameter greater than the pipeline diameter.

A preferred embodiment of the pipeline launch tower used for laying rigid pipes further carries a radius controller and/or one or more straightener tracks for conditioning the rigid pipe at a position upstream of the one or more tensioners.

It is preferred to have a crane, preferably an offshore mast crane, provided on deck of the vessel for performing various operations on deck, as well as from and to the vessel. The capacity of such crane may be several hundreds of tons. In preferred embodiments, the crane is used to move large objects to the pipeline launch trajectory.

The marine pipeline system according to the invention is also provided with an abandonment and recovery (A&R) system comprising at least one A&R cable and associated A&R winch, and a sheave arrangement with one or more sheaves supported by the pipeline launch tower at an upper position thereof. With one or more sheaves of the A&R sheave arrangement provided at an upper position of the pipeline launch tower an accessory is positionable below the sheave arrangement and the handling of large objects on deck is possible.

According to the invention, the support assembly of one or more tensioner frames is adapted to allow for displacement of the tensioner frame with respect to the tower between an active position, wherein the pipeline launch trajectory extends through the tensioner frame between the tracks, so that the tracks can engage on a pipeline, and a retracted non-operable position, so that the auxiliary trolley is moveable up and down in the pipeline launch trajectory.

From the same applicant auxiliary trolleys are known that are adapted to support the weight of the launched pipeline. In WO2012091556 of the same applicant, an auxiliary trolley is described, here a embodied as a travelling clamp, which is adapted to support the weight of the launched pipeline and which is movable along a rail in the pipeline launch trajectory when the one or more tensioner frames are in the retracted non-operable position, from a position above the uppermost tensioner to a position below the lowermost tensioner, the rail being supported by the pipeline launch tower.

Retraction the entire assembly of a tensioner frame and tracks mounted therein to a retracted position creates a large 'clear envelope' is created around the pipeline launch trajectory. This 'clear envelope' or 'zone' allows for the passage of the auxiliary trolley in the pipeline launch trajectory. Possibly, in the retracted position of the tensioner frame a clear envelope is present around the pipeline launch trajectory having a minimum distance to said tensioner of at least one meter, preferably at least 2 meters.

Possibly, one or more actuators, e.g. hydraulic cylinders, are provided for displacing the tensioner frame between the active and retracted position.

The displacement of the tensioner frame can for example be achieved by displacing the tensioner frame in its entirety, e.g. retracting it into the direction of the pipeline launch tower. Hence, the tensioner in its retracted position is held in a shape corresponding to the tension in the active position. In the retracted position, the pipeline launch trajectory then thus extends outside and spaced from said retracted tensioner frame. In a possible embodiment, the tower comprises two spaced apart main beams interconnected by a number of cross beams and wherein the one or more tensioners in their retracted position are located at least partly between said main beams, wherein preferably a cross beam is positioned below and above each tensioner.

On the other hand, it is also conceivable that the support assembly allows for a relative displacement of portions of the tensioner frame, thus allowing the frame to 'open'. For example, the support assembly may allow for displacement of a part of the tensioner frame comprising one or two tracks, away from another part of the tensioner frame comprising the remaining tracks. This may be seen as the 'opening of two arms'. In a possible embodiment the annular frame structure has at least one hinged frame part which can be moved between a 'closed position', wherein the annular frame structure forms a closed annulus, and an 'opened position', wherein the one or more hinged parts create a lateral opening in the frame structure over the height thereof, creating a clear envelope. According to the invention, the most important effect of the displacement of the tensioner frame is that the tensioner fame and the tracks should be retracted to such an extent that the auxiliary trolley is able to move up and down in the pipeline launch trajectory.

It is also envisaged that with a tensioner having an openable frame structure to prove a lateral opening therein, that the 'clear envelope' is created by the combination of retraction of the frame structure and the 'opening' of the frame structure. This means that in the retracted position the tensioner frame is held 'open' to create the 'clear envelope'.

Furthermore, in WO2009/134116 of the same applicant, an auxiliary trolley is also described, which is here provided with other sheaves of the A&R sheave arrangement. However, the here described marine pipeline installation system is not provided with retractable tensioners.

The advantage of the present invention is that the auxiliary trolley assists in A&R functionality, and allows restraining of the A&R wire at a lower position than at an upper position of the pipeline launch tower, increasing vessel stability significantly. In addition, interaction of the A&R cable with the hull of the vessel, which may result in damaging the A&R cable, is prevented as much as possible.

According to the invention, the auxiliary trolley comprises an A&R connector allowing the A&R cable to be connected to the auxiliary trolley at the position above the uppermost tensioner and thereby allowing the auxiliary trolley to lower with the launched pipeline suspended therefrom; and an A&R cable guide allowing the A&R cable to be guided by the auxiliary trolley and pass along the auxiliary trolley during A&R of the launched pipeline connected to the A&R cable, at least at the position below the lowermost tensioner.

The A&R cable guide e.g. comprises A&R sheaves, cable guidance holes, a so-called socket storage or the like, provided that the guide allows the A&R cable to be guided by and pass along the auxiliary trolley. Preferably, the A&R cable remains engaged with the auxiliary trolley. It is conceivable that the A&R cable can be disconnected from the trolley. Configurations wherein the A&R cable guide comprises a combination of a sheave and a hole are also conceivable.

The A&R system comprises at least one A&R cable and associated A&R winch. In a possible embodiment, the A&R system comprises multiple A&R cables and associated A&R winches. Preferably, each one of the A&R winches is provided with heave compensation. Preferably, the number of A&R cable guides on the trolley equals or exceeds the number of A&R cables. In case of a single A&R cable, the A&R cable guide on the auxiliary trolley is provided centrally, in the pipeline launch trajectory, while in case of two or more A&R cables, a corresponding number of A&R cable guide are preferably provided on the auxiliary trolley at opposite sides of the pipeline launch trajectory. The advantage of A&R cable guides at opposite sides of the pipeline launch trajectory is that wire twisting is prevented, and in addition that the pipeline launch trajectory remains clear.

For example, two A&R cable guides are provided at either side of the pipeline launch trajectory.

Possibly, the auxiliary trolley further comprises a horizontal guide along which at least two A&R cable guides are moveable, e.g. via shift cylinders, allowing one A&R cable guide to be positioned in the pipeline launch trajectory when a single fall A&R is applied, and two A&R cable guides to be positioned at opposite sides of the pipeline launch trajectory in case of a dual fall A&R.

In a possible embodiment, a plurality of A&R sheaves is provided at an upper position of the pipeline launch tower, which are provided at opposite sides of the pipeline launch trajectory. Preferably, these sheaves are movable relative to each other.

It is conceivable that the marine pipeline installation system may switch between a configuration having two or more A&R cables ('multiple fall'), and associated upper sheaves and A&R cable guides, and a configuration having a single A&R cable ('single fall'), and only a single upper A&R sheave and single A&R cable guide. It is then desired to move the A&R cable guides from a position wherein the A&R cable guides are at an equal distance from the pipeline launch trajectory to a position wherein one or some A&R cable guides have moved aside, and one A&R cable guides has moved into the pipeline launch trajectory.

In a possible embodiment, the auxiliary trolley further comprises a clamp, which is adapted to engage a pipeline, pipe section or accessory in the pipeline launch trajectory, preferably at the position above the uppermost tensioner, and the auxiliary trolley is adapted to allow for lowering of the pipeline or pipe section or accessory. The clamp can for example comprise a pipe clamp, a collar clamp-type or a friction clamp-type and/or a pin connection. In an embodiment, a fitting piece will be provided at the pipeline, pipe section, accessory or the like, which fitting piece is clamped by the clamp on the auxiliary trolley. Optionally, the clamp is provided with changeable inserts, to be able to engage with different objects. Optionally, the clamping means are releasable from the auxiliary trolley.

In an embodiment having multiple A&R guides provided on the auxiliary trolley at opposite sides of the pipeline launch trajectory, it is possible to provide the clamp in the pipeline launch trajectory, between the A&R guides.

Possibly, an auxiliary trolley winch is provided for moving the auxiliary trolley in the pipeline launch trajectory, which auxiliary trolley winch preferably operates independently of the A&R winch, but alternatively contributes to the A&R capacity. The auxiliary trolley winch is possibly provided with a constant tension control.

The auxiliary trolley is suspended from the pipeline launch tower. A rail is provided, preferably at the pipeline launch tower, along which the auxiliary trolley is moveable. An auxiliary trolley rail may alternatively be provided on a separate structure. It is preferred to be able to lock the auxiliary trolley in its lowest position, for example with pins, to take the full A&R off lead and side lead forces.

In an embodiment, the auxiliary trolley allows for man-riding on the trolley, in order to move personnel in the pipeline launch trajectory.

Preferably, the marine pipeline installation system further comprising a working platform supported by a support frame in the upper part of the tower, whereby the support frame is adapted to allow for displacement of the working platform with respect to the tower, such that the working platform is movable into and out of the tower pipeline launch trajectory. This is advantageous in operations where the pipeline is being cut at such an upper location, preferably above the one or more tensioners. As such, operations can be performed while the launched pipeline is being held by the one or more tensioners. Skidding the working platform out of the pipeline launch trajectory allows the auxiliary trolley to move up and down in the pipeline launch trajectory, past the working platform.

It is also conceivable that such a working platform is supported at a lower part of the tower, as is known e.g. from our application WO 2009/134116.

The marine pipeline installation system according to the present invention possibly further comprising a J-lay installation, which J-lay installation includes at least: a pipe loader for sequentially supplying pipe sections to an elevated position aligned with the pipeline launch trajectory, a pipe section alignment device for aligning a pipe section with the upper end of the previously launched pipeline and a pipe section work station, e.g. adapted for connecting the pipe section to the launched pipeline. As such, a multifunctional pipeline installation system is provided.

Preferably, in such a system the auxiliary trolley is additionally provided with a pipe clamp which is adapted to engage a pipe section in the pipeline launch trajectory above the uppermost tensioner, and wherein the auxiliary trolley is adapted to lower the pipe section, and preferably also of the launched pipeline connected thereto. As a result, the auxiliary trolley can be used for performing J-lay operations.

Possibly, a pipeline is installed containing a pipeline part realized by pipeline coming from a reel using the reel lay method, and a further part is realized by the J-lay method wherein sections of pipeline are added sequentially to the launched pipeline, said one or more tensioners being employed during reel laying in their active position, and the tensioners being removed to allow for performing J-lay.

In a possible embodiment, the system further comprises a hang off module arranged below said one or more tensioners, and preferably also below the lowermost position of the auxiliary trolley, which hang off module is adapted for clamping and supporting the weight of previously launched pipeline.

The invention also relates to a method for installing an accessory onto a pipeline to be laid on the seabed, wherein use is made of a marine pipeline installation system according to any of the preceding claims, further comprising a hang off clamp arranged below said one or more tensioners, comprising the following steps:
  positioning the auxiliary trolley above the uppermost tensioner;
  launching the pipeline from the one or more storage reels, via the pipeline guide and via the one or more tensioners in their active position, in the pipeline launch trajectory into the sea,
  interrupting the launch of pipeline, cutting the pipeline and hanging off the launched pipeline in the hang off module,
  displacing the one or more tensioner frames from the active position to the retracted position,
  positioning the accessory in the pipeline launch trajectory,
  attaching the accessory to the launched pipeline and to the auxiliary trolley,
  suspending the accessory and the launched pipeline from the A&R system,
  disengaging the hang off module from the launched pipeline,
  lowering the accessory with the launched pipeline by the A&R system.

Possibly, the accessory is a second end connector, provided at the end of a pipeline. The marine pipeline installation system of the invention is advantageously adapted to handle such a second end connector. To this end, a method of lowering a pipeline provided with a second end connector, wherein use is made of a marine pipeline installation system according to any of the preceding claims, further comprising a hang off clamp arranged below said one or more tensioners, comprising the following steps:
- positioning the auxiliary trolley above the uppermost tensioner and connecting the A&R cable to the auxiliary trolley;
- launching the pipeline from the one or more storage reels, via the pipeline guide and via the one or more tensioners in their active position, in the pipeline launch trajectory into the sea,
- positioning the second end connector in the pipeline launch trajectory,
- interrupting the launch of pipeline,
- attaching the second end connector to the auxiliary trolley,
- suspending the second end connector and the launched pipeline from the A&R system,
- displacing the one or more tensioner frames from the active position to the retracted position,
- lowering the second end connector with the launched pipeline by the auxiliary trolley,
- interrupting the launch of second end connector with launched pipeline and hanging off the second end connector in the hang off module,
- disconnecting the second end connector from the auxiliary trolley,
- disconnecting the A&R cable from the auxiliary trolley,
- providing the A&R cable in the A&R cable guide,
- connecting the A&R cable to the second end connector,
- lowering the second end connector with the launched pipeline by the A&R cable.

Possibly, the auxiliary trolley comprises pipe engagement means for engaging a pipe, and wherein the auxiliary trolley is used for carrying out the J-lay method, in particular for lowering of the pipe section.

The invention further relates to a method for transferring a launched pipeline from a first marine pipeline installation system according to any of the claims 1-7 to a second marine system which comprises a winch and a cable, the method comprising the following steps:
- positioning the auxiliary trolley above the uppermost tensioner;
- launching the pipeline from the one or more storage reels, via the pipeline guide and via the one or more tensioners in their active position, in the pipeline launch trajectory into the sea,
- interrupting the launch of pipeline and cutting the pipeline above the one or more tensioners, the launched pipeline being supported by the one or more tensioners,
- attaching the launched pipeline to the auxiliary trolley and connecting the A&R cable to the auxiliary trolley,
- suspending the launched pipeline from the A&R system,
- disengaging the one or more tensioners from launched pipeline and displacing the one or more tensioner frames from the active position to the retracted position,
- attaching the cable of the second marine system to the launched pipeline,
- launching the launched pipeline by the at least one A&R cable until the cable of the second marine system is taut,
- detaching the launched pipeline from the auxiliary trolley and support the launched pipeline from the winch of the second marine system.

Another aspect of the invention relates to a marine pipeline installation system for laying an offshore pipeline and/or installing a subsea riser, wherein the system comprises:
- a vessel comprising a hull and a deck,
- a moonpool, extending through the hull of the vessel, wherein the moonpool can be covered by a hatch assembly with one or more movable hatch panels adapted to cover said moonpool at the level of the deck,
- a pipeline launch tower provided above or adjacent the moonpool, which pipeline launch tower is adapted for launching the pipeline in a pipeline launch trajectory through the moonpool into the sea,
- an abandonment and recovery (A&R) system comprising at least one A&R cable and associated A&R winch, and an A&R sheave arrangement with one or more sheaves supported by the pipeline launch tower at an upper position thereof, wherein one or more other sheaves of the A&R sheave arrangement are provided on one or more of the moonpool hatches. This is advantageous to prevent wire twisting, and has the advantage that the pipeline launch trajectory remains clear.

This aspect may be used in combination with the first aspect of the invention: an embodiment is conceivable wherein the A&R system comprises a a sheave arrangement with one or more sheaves supported by the pipeline launch tower at an upper position thereof, and with one or more other A&R cable guides are provided on an auxiliary trolley, which is suspended from the pipeline launch tower, and with one or more other sheaves of the A&R sheave arrangement are provided on one or more of the moonpool hatches.

The invention will be further elucidated in the drawings, in which:

FIG. 1 schematically shows a perspective view of a marine pipeline installation system according to the present invention;

FIG. 2 shows a portion of the pipeline launch tower of the system of FIG. 1 in more detail in a perspective view;

FIG. 3*a* shows in detail an upper portion of the pipeline launch tower of FIG. 1 in a perspective view, with a workstation in a retracted position;

FIG. 3*b* shows the upper portion of FIG. 3*a*, with the workstation in the pipeline launch trajectory;

FIGS. 7A-7B show side views of a part of an embodiment of an auxiliary trolley to which an A&R cable is connected and a launched pipeline;

FIG. 7C shows a top view of the auxiliary trolley of FIGS. 7A and 7B without the A&R cable and launched pipeline connected thereto;

FIG. 7D shows a perspective view of an exemplary A&R connector according to the invention;

Figure 1:
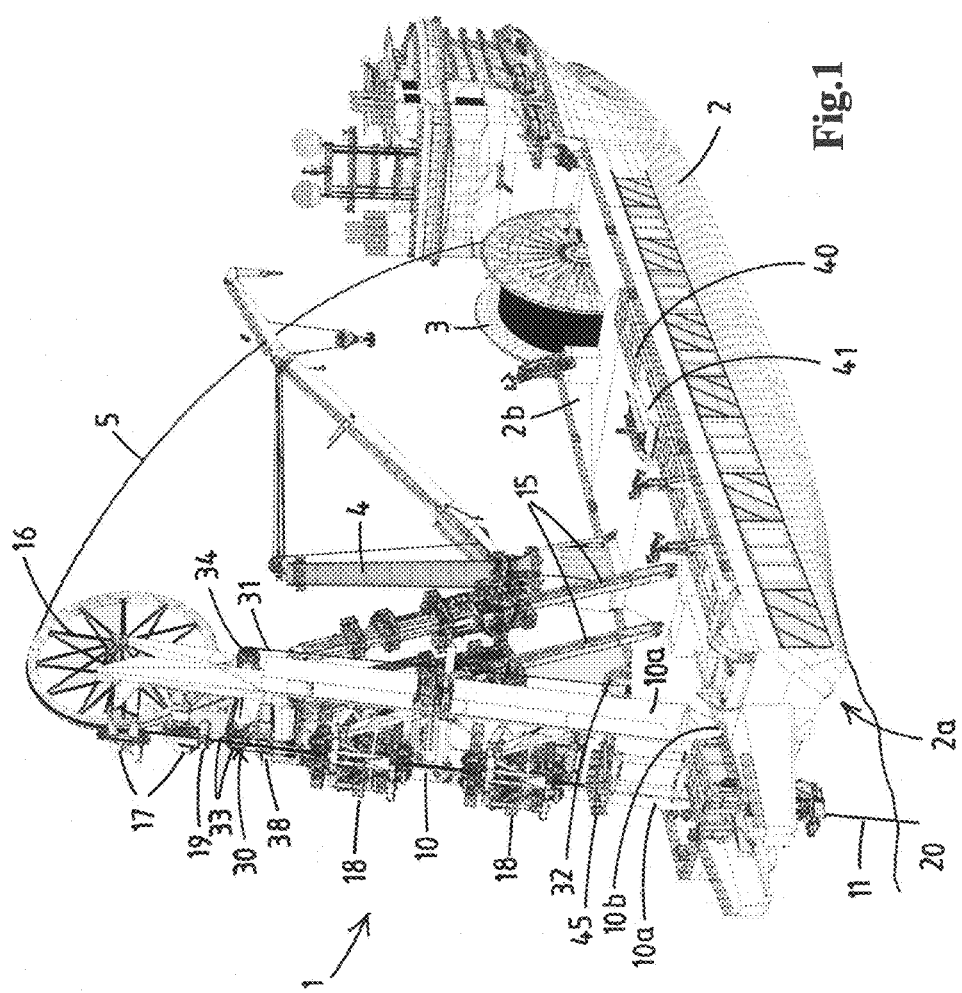

In FIG. 1 a marine pipeline installation system 1 for laying an offshore pipeline 5 and/or installing a subsea riser according to the invention is shown in a perspective view. On the vessel 2, a storage reel 3 is provided for storage of the pipeline 5 to be installed. Here a reel with a horizontal axis is provided, which horizontal axis is substantially at deck level 2b of the hull of the vessel. Alternatively, the reel may be mounted on a frame, provided on deck. Optionally, the frame is movable with respect to the deck. Yet alternatively, a storage reel with a vertical axis may be provided, which can be installed in the hull of the vessel or on top. Yet alternatively, it is also conceivable that a separate vessel or platform or the like is provide comprising the one or more storage reels.

On the deck 2b of the vessel also a crane 4 is provided for assisting in various operations.

The marine pipeline installation system 1 comprises a pipeline launch tower 10 which is adapted for launching the pipeline 5 in a reel lay method in a pipeline launch trajectory 11 into the sea. The pipeline launch trajectory 11 extends parallel and adjacent to the tower 10, into the sea 20. The tower 10 is mounted pivotably about pivot axis 10b on said vessel 2 to adjust inclination of the tower. To this end, so-called adjusters 15 are provided supporting the tower in various angled positions. In the shown embodiment, the tower 10 comprises two parallel columns 10a, defining a H-shaped tower.

The pipeline launch tower 10 is mounted on the stern 2a of a vessel 2. In an alternative, not shown embodiment, it is also conceivable to mount the pipeline launch tower at a side of the vessel. Yet alternatively, the vessel may be provided with a moonpool in the hull of the vessel, adjacent or above which the pipeline launch tower 10 can also be provided, allowing the pipeline launch trajectory to extend through the moonpool.

At an elevated position of the pipeline launch tower 10 a pipeline guide 16 is provided for guiding said pipeline 5 to the pipeline launch trajectory 11 along said tower 10. In this embodiment, the pipeline guide 16 is embodied as a round wheel, but it is also possible to provide a semi-arcuate pipeline guide. This pipeline guide is also referred to as the aligner, or the aligner wheel.

Upon laying rigid pipelines, a straightening assembly is required to straighten the pipeline to be laid. In this embodiment, a straightening assembly 17 is provided, of which two straightening tracks are visible. Commonly, straightening assemblies comprising 2 or 3 straightening tracks are applied. When a flexible pipeline is being installed, no straightening assembly is required. In the shown embodiment, a pipe clamp 19 is provided below the straightening assembly 17. Optionally, the straightening tracks, and possibly also the pipe clamp, are removable from the pipeline launch trajectory. This is advantageous when flexible pipelines are being installed, or when the pipeline launch trajectory is made clear for other purposes such as accessory installation, or A&R operations.

The reel lay method requires one or more tensioners 18 to install the pipeline: in the shown embodiment two tensioners 18 are provided. Each tensioner 18 comprising a tensioner frame and multiple tracks (not visible in detail in FIG. 1) supported by said tensioner frame, said tracks being adapted for engaging the pipeline and supporting at least part of the weight of the launched pipeline.

The tensioner frame is supported via an associated support assembly, which, according to the invention, is adapted to allow for displacement of the tensioner frame with respect to the tower 10 between an active position, as visible in FIG. 1, wherein the pipeline launch trajectory 11 extends through the tensioner frame and between the tracks, so that the tracks can engage on a pipeline, and a retracted non-operable position, so that an auxiliary trolley is moveable up and down in the pipeline launch trajectory. More details of the tensioner and the auxiliary trolley will be described later.

The marine pipeline installation system further comprises an abandonment and recovery (A&R) system 30, comprising at least one A&R cable 31 and associated A&R winch 32, and a sheave arrangement with two sheaves 33 supported at the stern side by the pipeline launch tower 10 at an upper position thereof. In the shown embodiment, at the bow-side of the tower, a load equalizer 34 of the A&R system is visible.

According to the present invention, an auxiliary trolley 38 is provided comprising two A&R cable guides, here two other sheaves of the A&R sheave arrangement. The auxiliary trolley 38 is also suspended from the pipeline launch tower. More details of the auxiliary trolley will be described later.

On the vessel 2 also a pipe loader 40 is provided, for sequentially supplying pipe sections to an elevated position of the pipeline launch tower 10 aligned with the pipeline launch trajectory 11. The system further comprises a pipe section alignment device for aligning a pipe section with the upper end of the previously launched pipeline. Preferably, this pipe section alignment device is provided in the pipeline launch tower 10. Furthermore, a pipe section work station 45 is provided, adapted for connecting the pipe section to the launched pipeline. As such, the marine pipeline installation system according to the invention can also be used for laying a pipeline in a J-lay modus. In the shown embodiment, the pipe loader 40 is also suitable for loading accessories 41 such as PLET's, as visible in FIG. 1.

Figure 2:
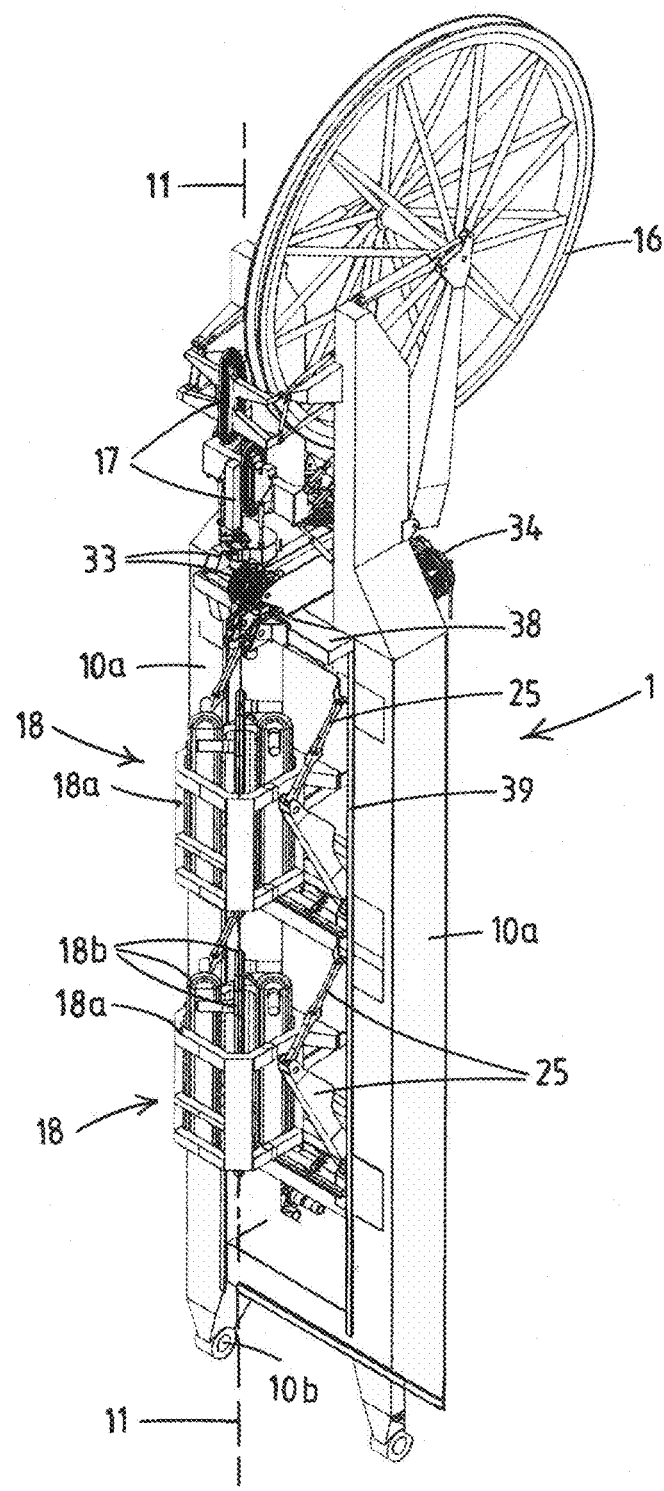

FIG. 2 shows a portion of the pipeline launch tower 10 of FIG. 1 in more detail. The FIGS. 3a and 3b show an upper portion of the pipeline launch tower 10 of FIG. 1 in detail. Same parts as visible in FIG. 1 are given same numbers.

Here, the upper tensioner 18 is visible, comprising a tensioner frame 18a in which four tensioning tracks 18b are supported. The tensioning tracks are adapted for engaging the pipeline 5 and supporting at least part of the pipeline weight, preferably the weight of the previously launched pipeline. The tensioner frame 18a is supported by an associated support assembly 25, here comprising two sets of beams connecting the tensioner frame 18a to the pipeline launch tower 10. According to the present invention, the support assembly 25 is adapted to allow for displacement of the tensioner frame 18a with respect to the tower 10. To this end, the support assembly 25 as shown comprises multiple beams which are pivotably interconnected, such that, upon actuation, the tensioners are retracted between the columns 10a of the tower 10.

Also visible in FIGS. 2a and 2b is an upper working platform 35, which is supported by a support frame 35a in the upper part of the tower. The support frame 35a is skiddable along a support frame guide 35b provided in the upper part of the tower 10. Preferably, the support frame guide 35b is substantially perpendicular to the tower pipeline launch trajectory. As such, the working platform 35 is movable into and out of the pipeline launch trajectory 11. In FIG. 2a, the working platform 35 is skidded out of the pipeline launch trajectory. Alternative embodiments without a support frame guide are also conceivable, e.g. comprising pivotably connected beams.

Above the upper working platform 35, the auxiliary trolley 38 and upper A&R sheaves 33 are visible in detail. On the auxiliary trolley two A&R sheaves 26 are provided, over which two A&R cables 31a and 31b are guided. Both the upper A&R sheaves 33 and the auxiliary trolley sheaves 26 are provided at opposite sides of the pipeline launch trajectory 11.

Also provided on the auxiliary trolley 38, below the A&R sheaves 26, are two A&R end connector catchers 27. The end connectors 28 are visible in FIGS. 2a and 2b. In the shown embodiment, the combination of an A&R sheave 26 with an A&R end connector catcher 27 is provided on a carriage 29 on the auxiliary trolley 38, as a result of which the sheaves and catchers are movable in a horizontal direction towards and away from the pipeline launch trajectory 11. This may be advantageous to prevent wire twisting, or alternatively when additional clamping means are provided on the auxiliary trolley 38, or for example when only a single A&R cable is required, which is to extend in the pipeline launch trajectory.

The above advantages may also require the upper A&R sheaves 33 to be movable in a horizontal direction. In the shown embodiment this is possible by actuators 33a.

According to the present invention, the auxiliary trolley 38 is moveable up and down in the pipeline launch trajectory 11. In the shown embodiment, a pair of rails 39 is provided on the pipeline launch tower 10. In particular, each column 10a of the tower is provided with a rail 39, across which the auxiliary trolley 38 is movable. The auxiliary trolley is provided with an A&R connector, here the end connector catchers 27, allowing the A&R cable to be connected to the auxiliary trolley at the position above the uppermost tensioner and thereby allowing the auxiliary trolley to lower with the launched pipeline suspended therefrom.

Figure 4:
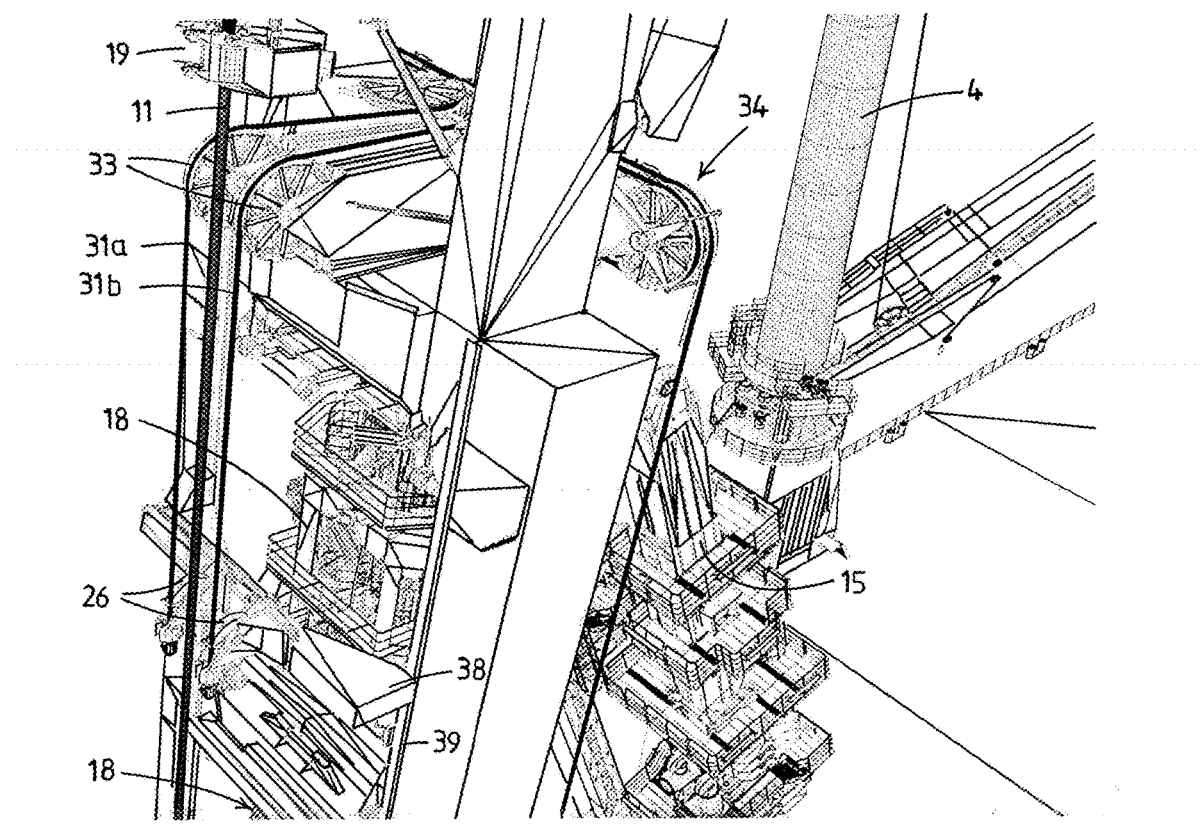
FIG. 4 shows in detail an upper portion of the pipeline launch tower of FIG. 1 in a perspective view, with the tensioners and the upper workstation in the retracted non-operable position.

In FIG. 4 the upper portion of the pipeline launch tower 10 is shown in a perspective view from above. Same parts as visible in FIG. 1 are given same numbers. A pipeline is present in the pipeline launch trajectory 11, which is held by the pipe clamp 19 provided below the straightening assembly (not visible). Two A&R cables 31a, 31b are visible, each adjacent, parallel and at opposite sides of the pipeline launch trajectory 11. The upper A&R sheaves 33 are also visible, as well as the equalizing sheaves 34. At the bow side of the pipeline launch tower 10, the adjusters 15 and the crane 4 are visible. At the stern side of the pipeline launch tower 10, the tensioners 18 are no longer provided as they are retracted to the non-operable position. On the other hand, it now is visible that the auxiliary trolley is allowed to move to a lower position in the pipeline launch trajectory 11, along rails 39.

Figure 5:
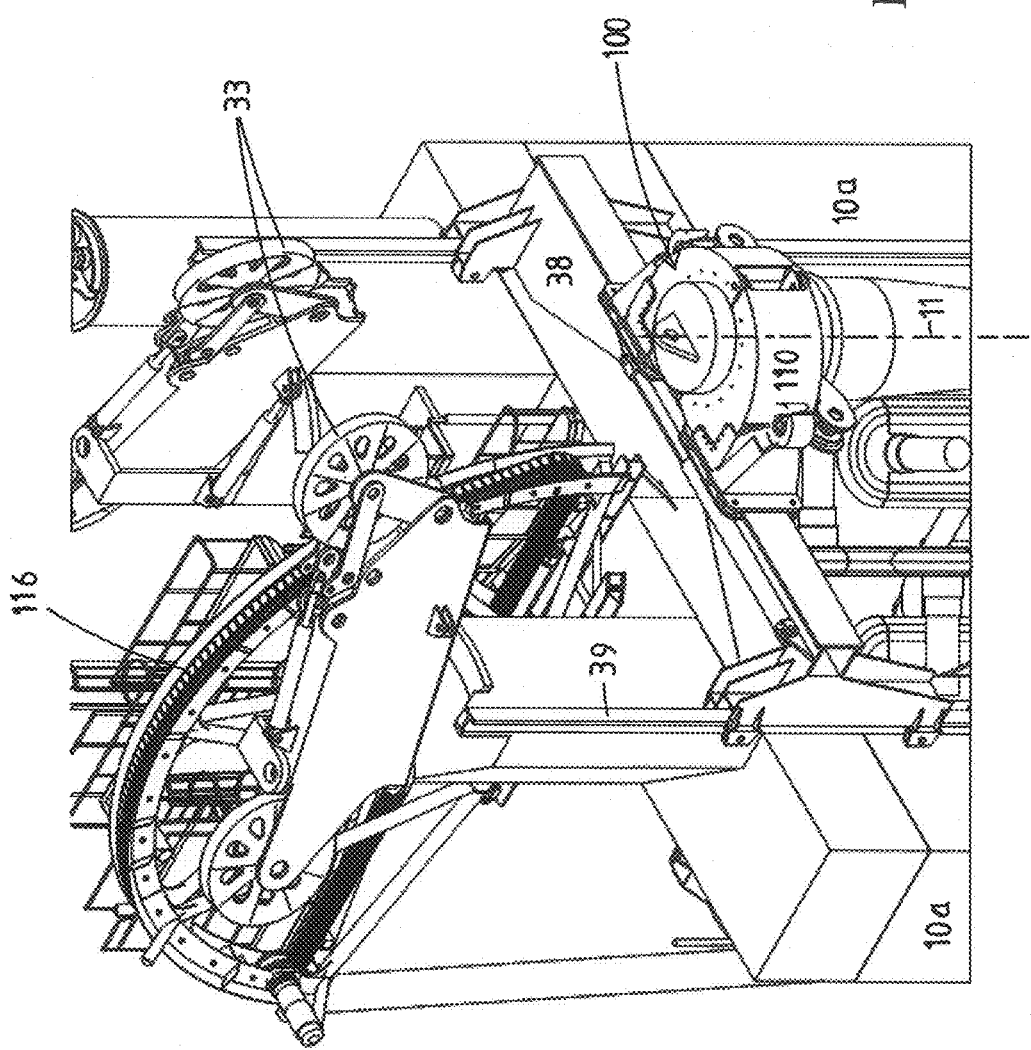
FIG. 5 shows in detail an alternative embodiment of an upper portion of a pipeline launch tower of a marine pipeline installation system according to the present invention.

In FIG. 5 an alternative embodiment of an upper portion of a pipeline launch tower of a marine pipeline installation system according to the present invention is shown. Same parts as visible in FIG. 1 are given same numbers. The pipeline launch tower of FIG. 5 differs from the pipeline launch tower of FIG. 1 in that here a semi-arcuate pipeline guide 116 is applied, which in the embodiment of FIG. 5 is provided below the upper A&R sheaves 33.

In the shown embodiment, the A&R sheaves have been removed from the auxiliary trolley 38. Instead, the auxiliary trolley 38 comprises a clamp 100, here a clamp that is releasable from the auxiliary trolley. The clamp 100 is provided in the pipeline launch trajectory 11 for engaging on a pipe section 110, here in an elevated position thereof. As such, the auxiliary trolley 38 can be used to allow for lowering of the pipe section 110.

Here, the clamp is embodied as a collar clamp. It is noted that in general the clamp can be provided with different inserts, to adapt the clamp to different pipe diameters and/or collar types.

Figure 6:
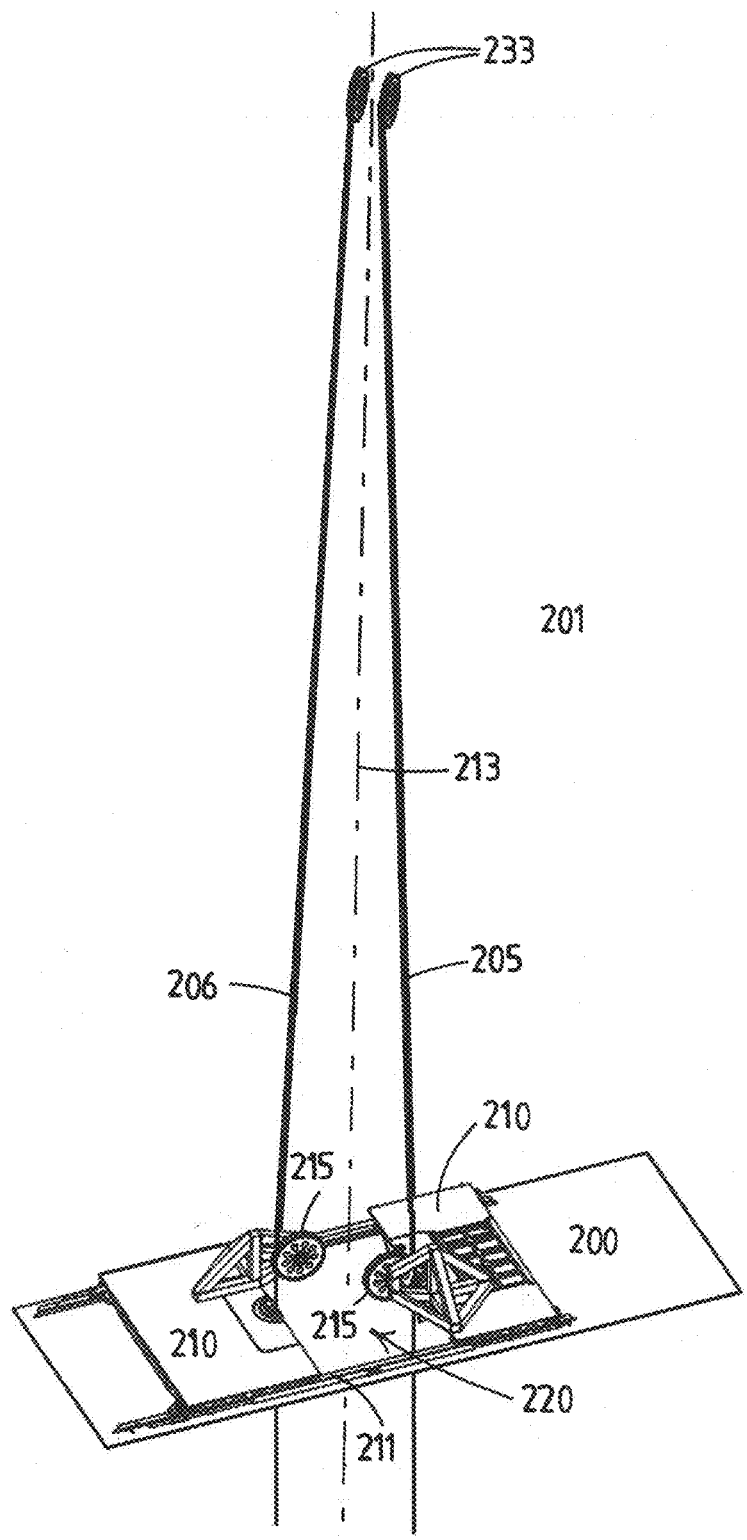
FIG. 6 shows in a perspective view an embodiment of a second aspect of the present invention.

FIG. 6 shows in a perspective view an embodiment of a second aspect of the present invention. This aspect of the invention relates to a marine pipeline installation system 201 for laying an offshore pipeline and/or installing a subsea riser, wherein the system shown in this embodiment comprises:

a vessel (not visible) comprising a hull (not visible) and a deck 200, a moonpool 220, extending through the hull of the vessel, wherein the moonpool can be covered by a hatch assembly with one or more movable hatch panels 210 adapted to cover said moonpool 220 at the level of the deck 200, which hatch panels are preferably movable across rails 211 provided on deck 200, a pipeline launch tower (not visible) provided above or adjacent the moonpool, which pipeline launch tower is adapted for launching the pipeline in a pipeline launch trajectory 213 through the moonpool 220 into the sea, an abandonment and recovery (A&R) system comprising two A&R cables 205, 206 and associated A&R winch (not visible), and a sheave arrangement with two sheaves 233 supported by the pipeline launch tower at an upper position thereof, and two other sheaves 215 of the A&R sheave arrangement are provided on the two moonpool hatches 210.

In FIGS. 7A-7B a side view of a part of an embodiment of an auxiliary trolley 50 is shown, in alternative positions. The auxiliary trolley 50 comprises an A&R connector 51, here embodied as a plate protrusion 51 comprising a hole, to which a dedicated A&R connector part 52, shown in detail in perspective in FIG. 7D, is connectable. The dedicated A&R connector part 52 comprises an opening 52c in the upper surface thereof, through which the A&R cable is allowed to extend. In the shown embodiment, the A&R connector part furthermore comprises an opening 52b at the side, allowing the A&R cable to be removed from the A&R connector part 52, or the A&R connector part 52 to be pivoted away from the A&R cable. The A&R cable 53 comprises a cable part 53a, only part of which is shown, and a tapering end portion 53b. The opening 52c of the A&R connector part matches the diameter of the A&R cable, but is smaller than the end portion 53b, and thus prevents the A&R end portion 53b to pass through the opening 52c.

Thereby, a connection between the A&R cable 53 and the auxiliary trolley 50 is established. It is noted that pivoting the A&R connector part 52 away from the A&R cable is only possible when there is no load exerted to the A&R cable connected to the auxiliary trolley 50. Only in this situation, the end portion 53b is allowed to be lowered with respect to the A&R connector part 52 and the A&R cable part 53a to pass through the opening 52b or vice versa.

In FIG. 7A a pipe 54 comprising a pipe end portion 54a is shown, which is connected via a bolt 55a to a pipe fitting piece 55 to the auxiliary trolley 50. In the configuration of FIG. 7A, the auxiliary trolley 50 is able to lower the launched pipeline with the A&R cable 53. The pipe fitting piece 55 comprises a tapering end portion 55b, which is adapted to be clamped by a collar clamp 50a on the auxiliary trolley 50. In particular, in the shown embodiment, the end portion 55b is rounded, while the collar clamp is shaped cup-like, resulting in an articulated joint allowing rotation about rotation point 55R. This rotation of pipe fitting piece 55 about point 55R in the collar clamp 50 allows for a compensation of length difference of the A&R cables. In FIG. 7B, a rotation of the auxiliary trolley 50 is shown, compensating for a length difference.

The collar clamp 50a comprises two parts 50a' and 50a", visible in particular in the top view of FIG. 7C, wherein collar clamp part 50a' is essentially C-shaped, and the collar clamp part 50a" is formed by a very small remaining circle-segment. For clarity reasons, the A&R connector part 52 is not shown in FIG. 7C. The collar clamp 50a surrounds the tapering end portion 55b of the pipe fitting piece 55, and thereby supports the launched pipeline. The collar clamp 50a is closed in the embodiments shown in FIGS. 7A-7C, and is shown in open configuration in FIG. 8A.

Furthermore, in FIG. 7A it is visible that the auxiliary trolley 50 comprises two A&R cable guides 50b' and 50b", here in line with the A&R connector 51, 52. The A&R cable guides 50b' and 50b" allow the A&R cable 53 to be guided by the auxiliary trolley 50 and pass along the auxiliary trolley 50 during A&R of the launched pipeline connected to the A&R cable. In the shown embodiment, the A&R cable guides are embodied as removable hardened valves for rope guidance. In the top view of FIG. 7C, pad eyes 50d are visible, which may be used for maintenance purposes. The A&R cable guides 50b' and 50b" are possibly removably mounted in the auxiliary trolley 50, allowing replacement e.g. in case of damage or other cable types.

In the configuration of FIG. 7B, the pipe 54 is clamped by a hang off clamp 56a, 56b, provided below the auxiliary trolley 50. This situation is envisaged when the auxiliary trolley 50 is at its lowermost position, below the lowermost tensioner (not shown). By clamping the pipe, the load of the pipe 54 and possibly the launched pipeline connected thereto is transferred from the auxiliary trolley 50 to the hang off clamp 56a, 56b. This allows the A&R cables, in particular the A&R cable end portions 53b, to pass through the A&R cable guides 50b' and 50b", and connect them directly or via a yoke or cross beam to a pipeline, pipe portion or accessory. The A&R connector part 52 is allowed to pivot away from the A&R cable 53, and may optionally be disconnected. This way, the A&R cable 53 is disconnected from the auxiliary trolley 50, but remains guided by the auxiliary trolley.

The removal of the load from the auxiliary trolley 50 additionally allows the pipe fitting piece 55 to rotate about point 55R in the collar clamp 50. In this situation, the collar clamp 50 may be opened by allowing opposed sideways movements of the collar clamp parts 50a' and 50a". As such, the pipe fitting piece 55 can be removed from the auxiliary trolley 50, thus disconnecting the pipe 54 from the auxiliary trolley 50.

In particular, the shown embodiment of auxiliary trolley 50 comprises two trolley parts 50' and 50", each part comprising an A&R cable guide 50b' and 50b" and a collar clamp part 50a', 50a".

Figure 8C:
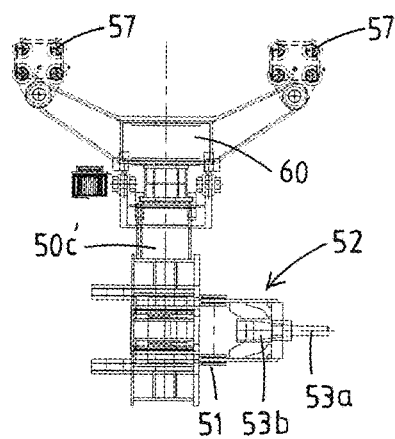
FIG. 8C shows a side view of part of the auxiliary trolley of FIG. 7, with the A&R cable connected thereto.
Figures 8A, 8B:
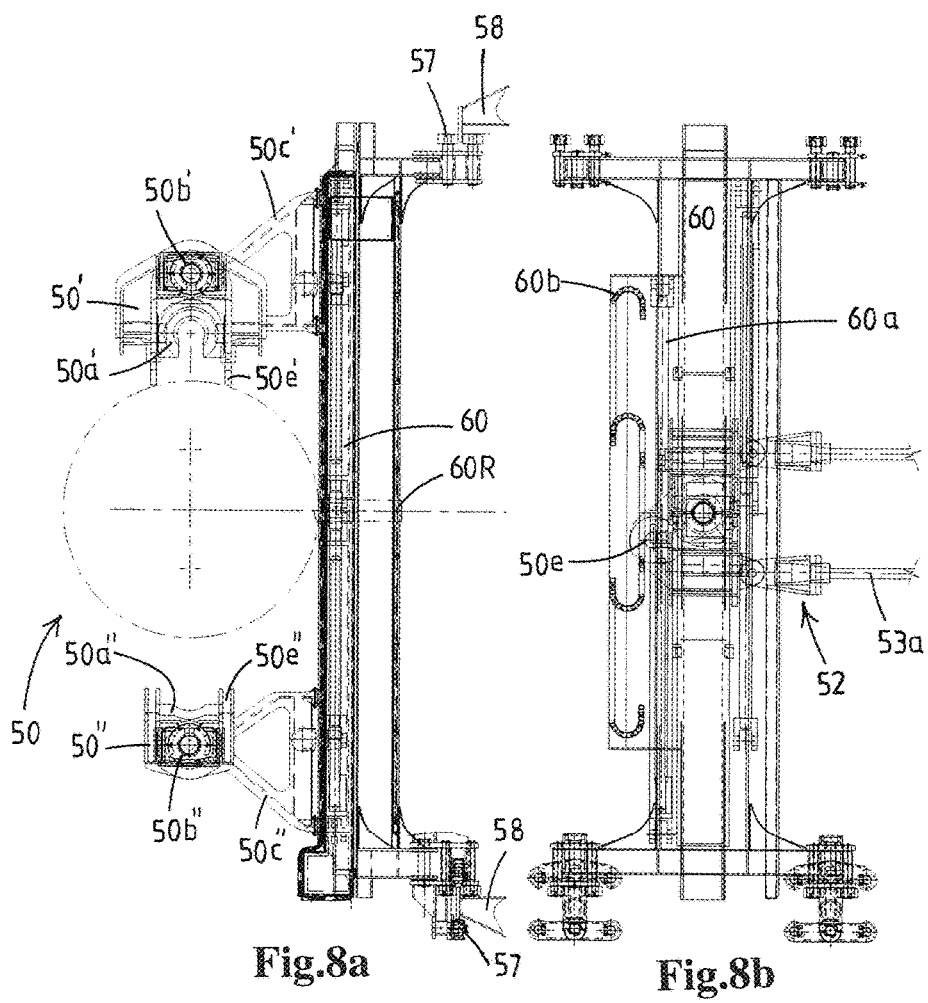
FIG. 8A shows a side view of the auxiliary trolley of FIG. 7, without the A&R cable and launched pipeline connected thereto.
FIG. 8B shows a front view of the auxiliary trolley of FIG. 7, with the A&R cable and launched pipeline connected thereto.

The sideways movements of the collar clamp parts 50a' and 50a" is visible in FIG. 8A, in which trolley part 50' comprises collar clamp part 50a' and A&R cable guide 50b', and auxiliary part 50" comprises collar clamp part 50a" and A&R cable guide 50b". In FIG. 8A the auxiliary trolley 50 is shown in its entirety, including bogies 57 with which the auxiliary trolley 50 is movable along a rail 58 supported by the pipeline launch tower (not shown). Furthermore, it is visible that the auxiliary trolley 50 comprises a horizontal guide 60, along which the two trolley parts 50' and 50" are movable via shift cylinders 60a. The shift cylinders may have their own power pack, or alternatively be fed by a drag chain, which will be explained later. The trolley parts are provided with frame parts 50c' and 50c", slidably engaging with the horizontal guide 60. In relation to FIG. 7b, the advantageous rotation of pipe fitting piece 55 about point 55R in the collar clamp 50 was described, allowing for a compensation of length difference of the A&R cables. This is only effective when the trolley is allowed to rotate, as visible in FIG. 7B, which in the shown embodiment is possible as the guide 60 comprises two parts, allowing a rotation about point 60R, which is made possible by mutual flexibility of the bogies 57. A length difference of up to 100 mm may preferably be compensated for. Hence, the auxiliary trolley acts as an equalizer.

In FIG. 8A, cooperating connector parts 50e' and 50e" of the two trolley parts 50' and 50" are visible, which are shown interconnected via a pin locking cylinder 50e as shown in FIGS. 7A, 7B and 8B. The hydraulics for the locking pin are provided by drag chains 60b, visible in FIG. 8B.

Figure 9:
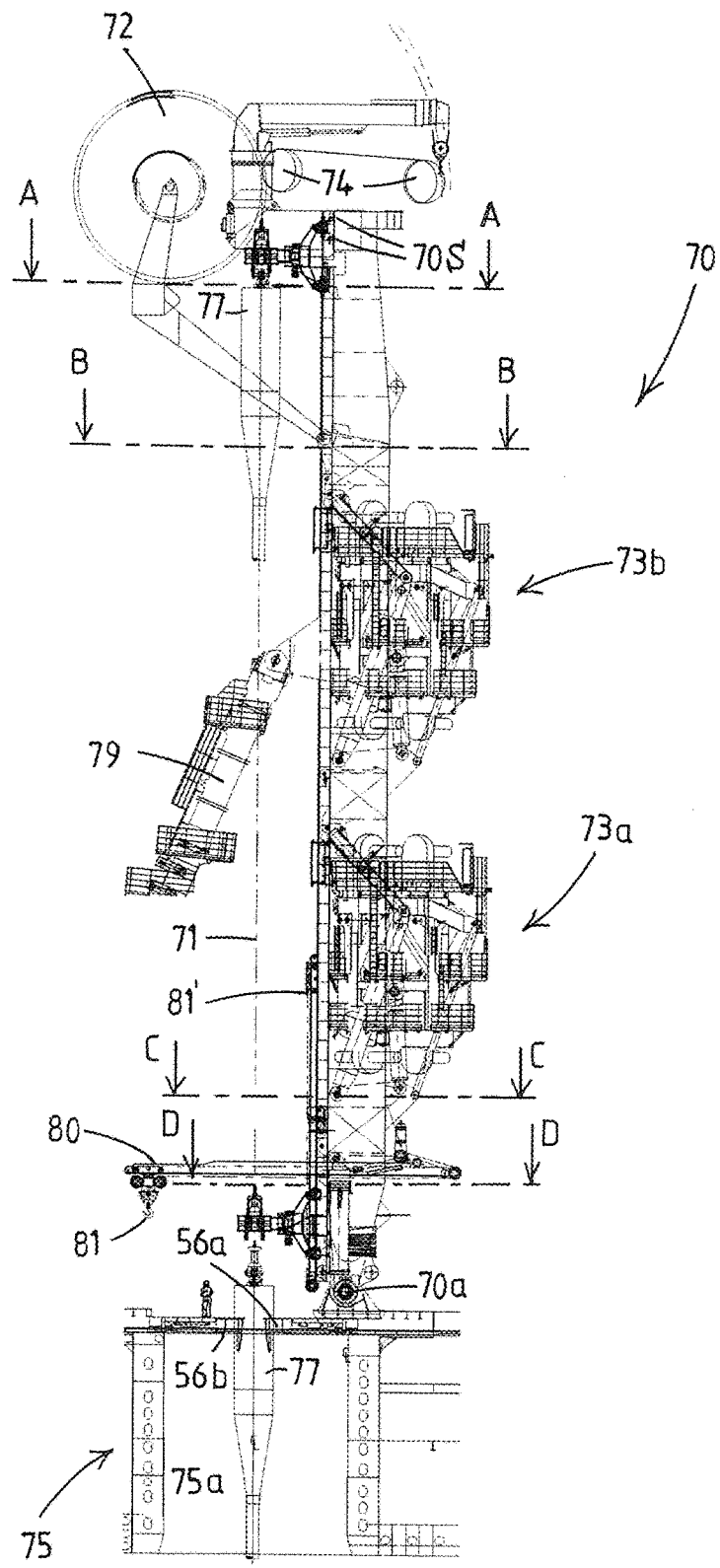
FIGS. 9 and 10 show alternative side views of a marine pipeline installation system according to the invention, with the auxiliary trolley indicated in multiple alternative positions.
Figure 10:
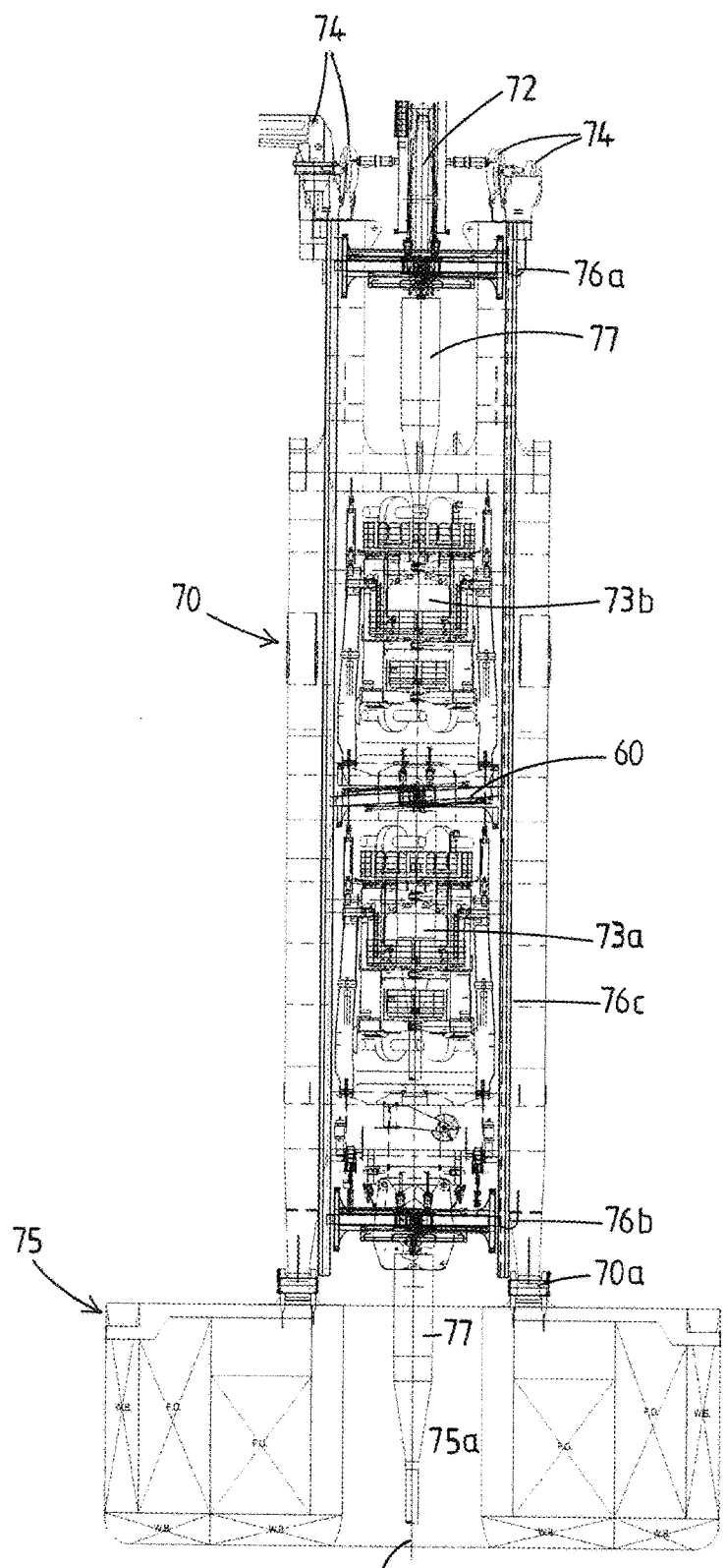

FIGS. 9 and 10 show alternative side views of a marine pipeline installation system according to the invention, with the auxiliary trolley indicated in multiple alternative positions. In particular, the second end handling process is elucidated in relation to FIGS. 9, 10 and 11. This process of second end handling preferably takes place with the pipeline launch tower at an angle of 90° with respect to the vessel onto which it is mounted.

In FIGS. 9 and 20, a pipeline launch tower 70 is visible, which is adapted for launching the pipeline in a pipeline launch trajectory 71 into the sea. The pipeline launch tower 70 is mounted pivotable about horizontal pivot axis 70a onto the deck of a vessel 75, via one or more adjusters 79 (only part of which is shown). In the vessel, a moonpool 75a is provided, through which the pipeline launch trajectory 71 extends. A pipeline guide 72 is provided at an elevated position of the tower 70, for guiding a pipeline to the pipeline launch trajectory 71. Furthermore, two tensioners 73a, 73b are visible, comprising a tensioner frame and multiple tracks supported by the tensioner frame, which are not shown in detail. The tensioner tracks are adapted for engaging the pipeline and support at least part of the weight of the launched pipeline. The tensioner frame is supported via an associated support assembly by the tower, and allows for displacement of the tensioner frame with respect to the tower 70 between an active position, not shown, wherein the pipeline launch trajectory 71 extends through the tensioner frame and between the tracks, so that the tracks can engage on a pipeline, and a retracted and non-operable position, as shown in FIGS. 9 and 10. The pipeline installation system further comprises an abandonment and recovery system, here comprising two A&R cables and associated A&R winches (not visible), and a sheave arrangement with four sheaves 74 supported by the pipeline launch tower 70 at an upper position thereof.

In FIG. 10, an upper check valve 76*a* and a lower check valve 76*b* are visible, for connecting a drag chain 76*c* comprising electronics and hydraulics to the auxiliary trolley 50, providing a hydraulic feed e.g. for the shift cylinders 60*a* and/or the pin locking cylinder 50*e*.

In FIG. 10, the horizontal guide 60 of the auxiliary trolley is shown in a rotated position, which allows for a (maximum) A&R cable length difference.

In FIG. 9, at the line A-A, the auxiliary trolley 50 is shown at an upper parking position. Position sensors 70*s* are provided detecting the position of the trolley. A cross-section of the auxiliary trolley 50 at the line A-A is visible in FIG. 11A. In this position, second end connector 77, which is positioned in the pipeline launch trajectory 71 above the tensioners 73*a*, 73*b*, below the auxiliary trolley 50, is connected to the auxiliary trolley 50, in particular to the collar clamp 50*a* provided on the trolley 50. In addition, the A&R cables are connected to the auxiliary trolley 50, not visible in detail.

Figure 11A:
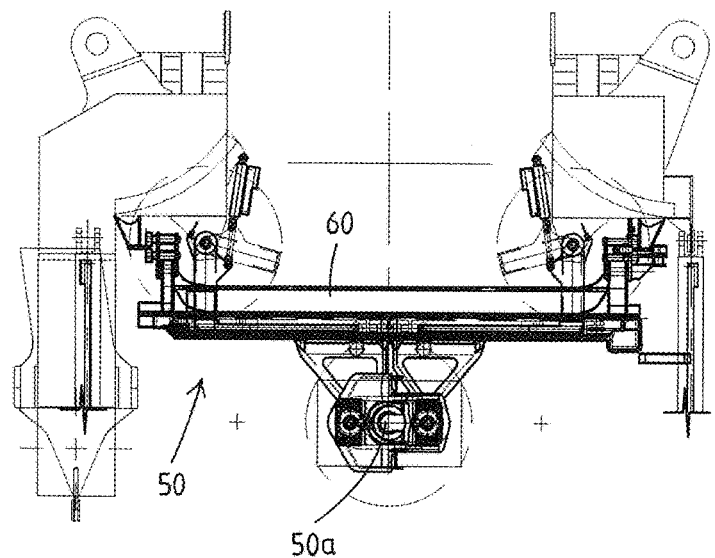
FIG. 11A shows the auxiliary trolley of FIG. 7 in a top view, position A-A as indicated in FIG. 9.
Figure 11B:
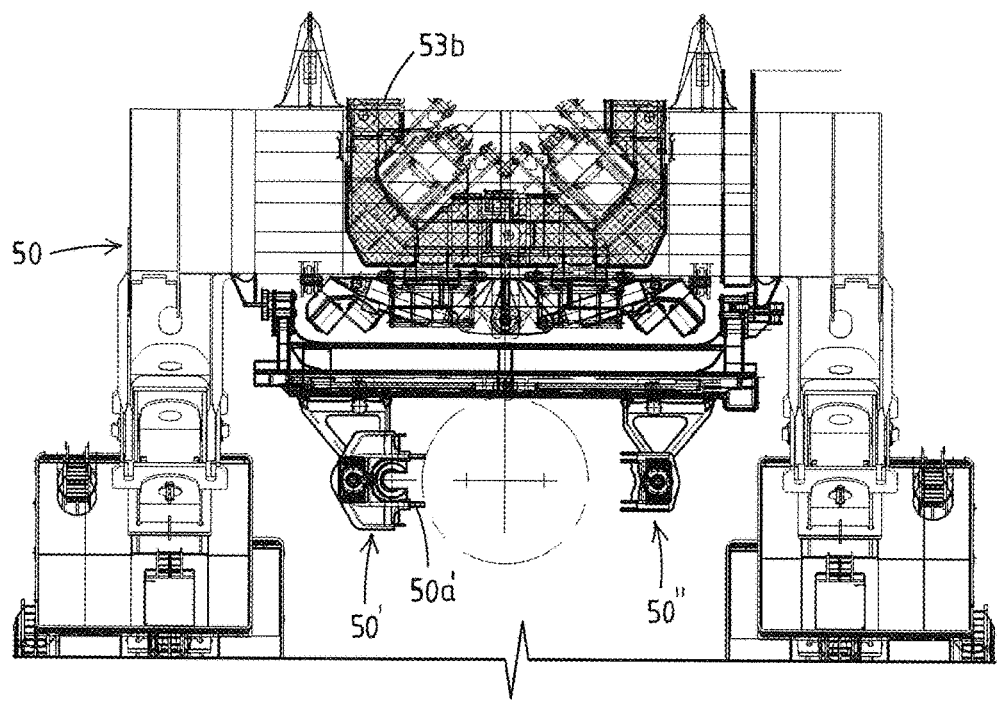
FIG. 11B shows the auxiliary trolley of FIG. 7 in a top view, position B-B as indicated in FIG. 9.
Figure 11C:
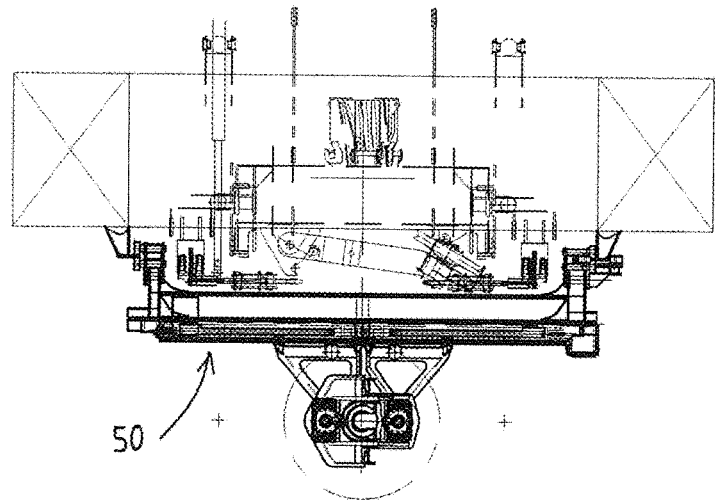
FIG. 11C shows the auxiliary trolley of FIG. 7 in a top view, position C-C as indicated in FIG. 9.

In FIG. 9, at line C-C, the auxiliary trolley 50 is shown at a second end connector transfer position, shown in cross section in FIG. 11C. This position of the trolley is comparable with the situation in FIGS. 7A and 7B, in which the load is just about to be transferred from the A&R system to the hang-off clamp 56*a*, 56*b*, allowing the second end connector 77 to be disconnected from the auxiliary trolley 50, similar to the removal of pipe end 54 from the trolley in FIGS. 7A and 7B. In particular, a fitting piece similar to fitting piece 55 as shown in FIGS. 7A and 7B has to be removed. To this end, the tower 70 is in this embodiment provided with a hoisting beam 80 provided with a hook 81, to contact and hoist the fitting piece from the pipeline/pipe section/accessory such as end connector, and translate it to a parking position. Advantageously, the hoisting beam with hook 81 may be pivoted away to a retracted position indicated with reference 81'. It is noted that in FIG. 9, the second end connector 77 is indicated at a position below the position of FIG. 11C, i.e. below line C-C, at the lowermost position in which the second end connector 77 is held by the hang off clamp 76.

In FIG. 11B, the auxiliary trolley 50 is shown at an upper position in the tower, at line B-B in FIG. 9. In FIG. 11B, the auxiliary trolley 50 is depicted in a dual fall A&R position, in which the trolley parts 50' and 50" have moved apart and the clamping parts 50*a*' and 50*a*" are moved apart. Hence, in this situation no pipe section or accessory is supported by the clamp 50*a*, but the trolley parts have moved away from each other allowing dual fall A&R with the cable moved apart, preventing entanglement and wire twist of the A&R cables. Part of the retracted tensioner 53*b* is clearly visible.

Figure 11D:
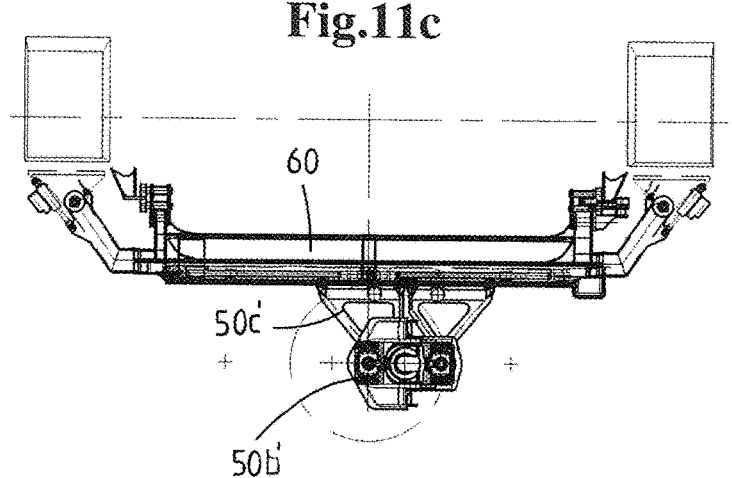
FIG. 11D shows the auxiliary trolley of FIG. 7 in a top view, position D-D as indicated in FIG. 9, in a single fall A&R position.

In FIG. 9, a lowermost position of the auxiliary trolley 50, below the lowermost tensioner 73*a*, is indicated by line D-D. In this position, guidance of the A&R cable by the auxiliary trolley is possible, allowing the A&R cable to pass along the auxiliary trolley 50. In FIG. 11D, a configuration wherein a single A&R cable is present is shown, which is guided in the pipeline launch trajectory 71 by providing A&R cable guide 50*b*' in the pipeline launch trajectory 71, accomplished by moving trolley frame part 50*c*' along horizontal guide 60.

Figure 11E:
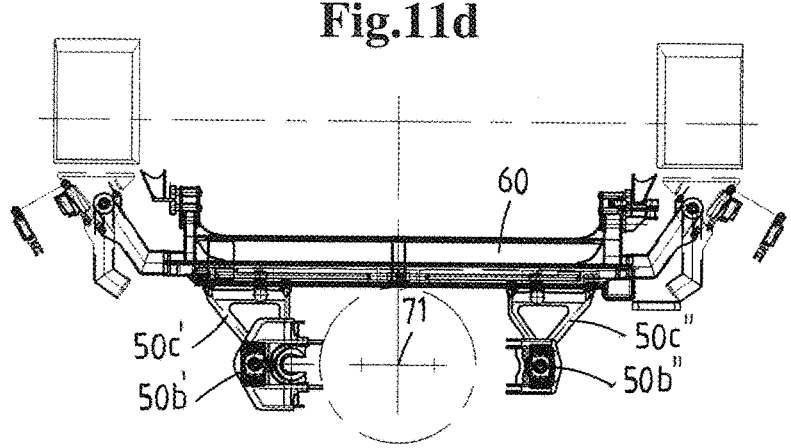
FIG. 11E shows the auxiliary trolley of FIG. 7 in a top view, position D-D as indicated in FIG. 9, in a dual fall A&R position.

An alternative configuration is presented in FIG. 11E, wherein a dual A&R cable is present, comprising two A&R cables which are guided at opposite sides remote from the pipeline launch trajectory 71, by providing A&R cable guides 50*b*' and 50*b*" at opposed sides of the pipeline launch trajectory 71, accomplished by moving trolley frame parts 50*c*' and 50*c*" along horizontal guide 60.

What is claimed is:

1. A marine pipeline installation system for laying an offshore pipeline and/or installing a subsea riser, said system at least being adapted to carry out the reel lay method, wherein the system comprises:

one or more storage reels for storage of the pipeline to be installed;

a pipeline launch tower which is adapted for launching the pipeline one single pipeline launch trajectory into the sea;

a pipeline guide provided at an elevated position for guiding said pipeline to said single pipeline launch trajectory along said tower;

one or more tensioners, each tensioner comprising a tensioner frame and multiple tracks supported by said tensioner frame, said tracks being adapted for engaging the pipeline and supporting at least part of the weight of the launched pipeline;

the tensioner frame being supported via an associated support assembly, the support assembly of one or more tensioner frames being adapted to allow for displacement of the tensioner frame with respect to the tower between an active position, wherein said single pipeline launch trajectory extends through the tensioner frame and between the tracks, so that the tracks can engage on a pipeline, and a retracted non-operable position, where said single pipeline launch trajectory extends outside the tensioner frame and not between the tracks;

an abandonment and recovery (A&R) system comprising at least one A&R cable and associated A&R winch and a sheave arrangement with one or more sheaves supported by the pipeline launch tower at an upper position thereof;

an auxiliary trolley adapted to support the weight of the launched pipeline which is movable along a rail in said single pipeline launch trajectory when the one or more tensioner frames are in the retracted non-operable position, from a position above the uppermost tensioner to a position below the lowermost tensioner, the rail being supported by the pipeline launch tower;

wherein the movable auxiliary trolley comprises:

an A&R connector allowing the A&R cable to be connected to the auxiliary trolley at the position above the uppermost tensioner and thereby allowing the auxiliary trolley to lower with the launched pipeline suspended therefrom; and a clamp comprising two clamp parts and which are moveable between an open configuration allowing the provision of a pipeline, pipe section or accessory in said single pipeline launch trajectory adjacent the clamp parts, and a closed configuration in which the clamp is adapted to engage the pipeline, pipe section or accessory in said single pipeline launch trajectory.

2. The marine pipeline installation system according to claim 1, the auxiliary trolley further comprising two trolley parts, each part comprising a clamp part, the clamp parts being movable via respective frame parts slidably engaging with a horizontal guide of the auxiliary trolley.

3. The marine pipeline installation system according to claim 2, wherein the frame parts are movable along the horizontal guide via shift cylinders.

4. The marine pipeline installation system according to claim 1, the auxiliary trolley further comprising an A&R cable guide allowing the A&R cable to be guided by the auxiliary trolley and pass along the auxiliary trolley during A&R of the launched pipeline connected to the A&R cable, at least at the position below the lowermost tensioner.

5. The marine pipeline installation system according to claim 4, wherein each trolley part further comprises an A&R cable guide.

6. The marine pipeline installation system according to claim 5, the frame parts being movable along the horizontal guide allowing one A&R cable guide to be positioned in said single pipeline launch trajectory when a single fall A&R is applied, and two A&R cable guides to be positioned at opposite sides of said single pipeline launch trajectory in case of a dual fall A&R.

7. The marine pipeline installation system according to claim 1, further comprising a pipe fitting piece via which a pipe is connectable to the auxiliary trolley.

8. The marine pipeline installation system according to claim 1, wherein the clamp is a collar clamp.

9. The marine pipeline installation system according to claim 1, wherein the clamp part is essentially C-shaped, and the clamp part is formed by a very small remaining circle-segment.

10. The marine pipeline installation system according to claim 1, wherein the horizontal guide is rotatable about a point and wherein bogies with which the auxiliary trolley is movable along the rail are mutually flexible, to compensate for a difference in length of the A&R cables.

11. The marine pipeline installation system according to claim 4, wherein the A&R cable guide comprises A&R sheaves and/or A&R cable guidance holes.

12. The marine pipeline installation system according to claim 1, wherein the clamp is adapted to engage a pipeline, pipe section or accessory in said single pipeline launch trajectory at the position above the uppermost tensioner.

13. The marine pipeline installation system according to claim 1, further comprising a working platform supported by a support frame in the upper part of the tower, whereby the support frame is adapted to allow for displacement of the working platform with respect to the tower, such that the working platform is movable into and out of the tower pipeline launch trajectory.

14. The marine pipeline installation system according to claim 1, further comprising a J-lay installation, which J-lay installation includes at least:
 a pipe loader for sequentially supplying pipe sections to an elevated position aligned with said single pipeline launch trajectory;
 a pipe section alignment device for aligning a pipe section with the upper end of the previously launched pipeline; and
 a pipe section work station, adapted for connecting the pipe section to the launched pipeline.

15. The marine pipeline installation system according to claim 14, wherein the auxiliary trolley comprises a pipe clamp adapted to engage a pipe section in the said single pipeline launch trajectory above the uppermost tensioner, and wherein the auxiliary trolley is adapted to lower the pipe section.

16. The marine pipeline installation system according to claim 15, wherein the auxiliary trolley is adapted to lower the pipe section and the launched pipeline connected thereto.

* * * * *